(12) United States Patent
Li et al.

(10) Patent No.: US 9,036,651 B2
(45) Date of Patent: May 19, 2015

(54) SYSTEM AND METHODS FOR MANAGING GROUP PARAMETERS IN UNLICENSED SPECTRUM COMMUNICATIONS

(75) Inventors: Zexian Li, Espoo (FI); Basavaraj Patil, Coppell, TX (US)

(73) Assignee: Nokia Corporation, Espoo (FI)

( * ) Notice: Subject to any disclaimer, the term of this patent is extended or adjusted under 35 U.S.C. 154(b) by 900 days.

(21) Appl. No.: 12/651,124

(22) Filed: Dec. 31, 2009

(65) Prior Publication Data
US 2011/0158147 A1 Jun. 30, 2011

(51) Int. Cl.
*H04L 12/413* (2006.01)
*H04W 72/08* (2009.01)
*H04W 16/14* (2009.01)
*H04W 84/18* (2009.01)

(52) U.S. Cl.
CPC ............ *H04W 72/082* (2013.01); *H04W 16/14* (2013.01); *H04W 84/18* (2013.01)

(58) Field of Classification Search
None
See application file for complete search history.

(56) References Cited

U.S. PATENT DOCUMENTS

| 5,054,042 | A | * | 10/1991 | Soury et al. | 455/557 |
| 6,108,550 | A | * | 8/2000 | Wiorek et al. | 455/447 |
| 7,366,202 | B2 | | 4/2008 | Scherzer et al. | |
| 7,769,050 | B2 | | 8/2010 | Scherzer et al. | |
| 7,787,881 | B2 | * | 8/2010 | Ueda | 455/439 |
| 7,937,450 | B2 | * | 5/2011 | Janik | 709/217 |
| 2003/0115261 | A1 | * | 6/2003 | Mohammed | 709/203 |
| 2004/0028003 | A1 | * | 2/2004 | Diener et al. | 370/319 |
| 2004/0105434 | A1 | * | 6/2004 | Baw | 370/355 |
| 2005/0122999 | A1 | * | 6/2005 | Scherzer et al. | 370/480 |
| 2005/0138178 | A1 | * | 6/2005 | Astarabadi | 709/227 |
| 2007/0293143 | A1 | * | 12/2007 | Harris | 455/3.01 |
| 2008/0013480 | A1 | * | 1/2008 | Kapoor et al. | 370/328 |
| 2010/0069091 | A1 | * | 3/2010 | El-Saidny | 455/456.3 |

FOREIGN PATENT DOCUMENTS

CA 2 548 998 A1 6/2005

OTHER PUBLICATIONS

Akyildiz, I.F., et al. "NeXt generation/dynamic spectrum access/cognitive radio wireless networks: A survey," Computer Networks 50 (2006), pp. 2127-2159.

(Continued)

*Primary Examiner* — Kibrom T Hailu
*Assistant Examiner* — James P Duffy
(74) *Attorney, Agent, or Firm* — Squire Patton Boggs (US) LLP

(57) ABSTRACT

A method, apparatus, and system for providing a communication resource for a communication device in a communication system. In one embodiment, an apparatus includes a processor and memory having computer program code. The memory and the computer program code are configured to, with the processor, cause the apparatus to perform at least the following: transmitting a message attaching to an access station over the air in an unlicensed frequency spectrum; receiving an acknowledgement over the unlicensed frequency spectrum; and receiving a multicast message indicating one selected from a channel change within the unlicensed frequency spectrum for a group including the apparatus and a radio technology change to a predetermined radio technology not using the unlicensed frequency spectrum for the group including the apparatus.

18 Claims, 5 Drawing Sheets

(56) References Cited

OTHER PUBLICATIONS

IEEE Standard for Information technology-Telecommunications and information exchange between systems-Local and metropolitan area networks-Specific requirements, "Part 11: Wireless LAN Medium Access Control (MAC) and Physical Layer (PHY) Specificaitons," IEEE Computer Society, IEEE Std 802.11™-2007, Jun. 12, 2007, 1232 pages.

IEEE Standard for Local and metropolitan area networks, "Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Computer Society and the IEEE Microwave Theory and Techniques Society, IEEE Std 802.16e™-2005 and IEEE Std 802.16™-2004/Cor1-2005, Feb. 28, 2006, 864 pages.

*In the Matter of Unlicensed Operation in the TV Broadcast Bands*; ET Docket No. 04-186 and *Additional Spectrum for Unlicensed Devices Below 900 MHz and in the 3 GHz Band*; ET Docket No. 02-380, Second Report and Order and Memorandum Opinion and Order, Adopted Nov. 4, 2008; Released Nov. 14, 2008, 130 pages.

* cited by examiner

SYSTEM AND METHODS FOR MANAGING GROUP PARAMETERS IN UNLICENSED SPECTRUM COMMUNICATIONS

TECHNICAL FIELD

The present invention is directed, in general, to communication systems and, in particular, to a system, apparatus and method for providing a communication resource for managing communication devices in a communication system using a broadcast spectrum allocated for unlicensed communications devices, and for grouping devices using the unlicensed spectrum.

BACKGROUND

Recent advances in communications and in particular advances in the wireless delivery of services have been rapid. Long term evolution ("LTE") of the third generation partnership project ("3GPP"), also referred to as 3GPP LTE, refers to research and development involving the 3GPP Release 8 and beyond, which is the name generally used to describe an ongoing effort across the industry aimed at identifying technologies and capabilities that can improve systems such as the universal mobile telecommunication system ("UMTS"). Radio access technologies ("RATs") to serve the increasing need for mobile and broadband technologies continue to develop, such as LTE Advanced ("LTE-A"), 4G, WiMAX, in addition to older wireless technologies such as 3G and WiFi that are in widespread use.

As wireless communication systems such as cellular telephone, wireless data, satellite, and microwave communication systems become widely deployed and continue to attract a growing number of users, there is a pressing need to accommodate a large and variable number of communication devices transmitting a growing range of communication applications with fixed resources. The available frequency spectrum is a limited resource and the increases in the types and number of services offered, and the increase in users of these devices, have created a capacity limitation in many areas. Additional spectrum is clearly needed to expand the capacity of these systems for the demand now and also for future growth, A recent development that offers additional spectrum for wireless communication systems in the United States is the transition to all digital television signals. Following the transition from analog over the air TV broadcasting to the all digital television broadcasts completed in 2009, a portion of the frequency spectrum previously allocated for analog television broadcasts became available. The Federal Communications Commission ("FCC") has determined that the so-called "white space" spectrum or "WS" between licensed broadcast television stations and certain other licensed communications (certain medical devices, radio telescopes, wireless microphones and some other uses) that became available due to the transition to all digital TV broadcasts may now be used by unlicensed devices. The devices that use the television white space ("TVWS") are required to comply with and follow certain guidelines created to prevent interference with licensed devices using channels in the spectrum. A report and order released by the FCC Nov. 18, 2008 provides the regulatory details, available from the FCC and numbered as "FCC 08-260". This report is hereby incorporated by reference herein in its entirety.

The white space spectrum previously used for analog television broadcasts is considered especially important because this frequency spectrum, located below 1 GHz, has good range and other transmission characteristics that are especially attractive. In certain areas the need for wireless voice and wireless data communications services has, to date, been unmet. An example is in certain rural areas in the United States. It is expected that this newly available bandwidth may provide an opportunity to provide these services in these areas. Other areas where current broadband services are inadequate for the service demand are in very dense urban areas. This new spectrum may be used to provide additional signal capacity in those areas. As the amount of voice and data transmitted wirelessly increases and data intensive applications such as videoconferencing, video and movie broadcasts, interactive gaming, and the like become prevalent in wireless devices, and in particular in mobile wireless devices such as Personal Digital Assistant ("PDAs") and advanced cellphones, the capability to use this new spectrum is expected to be very important.

The FCC has determined that two types of unlicensed devices may use the new spectrum in the "white space." Fixed devices, base stations or access stations ("AS"), and portable or mobile station devices ("MS") are both envisioned to use the spectrum. However, certain requirements are made to ensure that these new devices do not interfere with existing, licensed devices already using the spectrum. Licensed devices includes for example, broadcast television stations and wireless microphones. Wireless microphones are used, for example, in sports arenas, performance halls, theatres, television studios, and the like. Wireless microphones pose a particular challenge as they are not always in use and so not always present in the spectrum. They are also mobile devices.

The FCC regulations envision the unlicensed TV band devices ("TVBDs") operating in several modes that are created so as to avoid this interference. As a first requirement, all unlicensed devices are required to use spectrum sensing to detect TV stations, wireless microphones, and other existing licensed or higher priority devices. The TVBDs are to stop transmitting within a short time of detecting a device where interference would otherwise occur. In addition, certain devices are master devices and certain devices are client devices. A client device only operates on channels and as enabled by a master device. A master device is one that, in addition to spectrum sensing, also is required to access a stored database of the location and channels of known licensed transmitter stations on a frequent basis. These devices also use geo-location or if fixed, an assigned location parameter to determine its own location, so that in accessing the database it can avoid transmitting on the spectrum when it is too close to a licensed device. Certain fixed stations may also initiate a network. Some personal/mobile stations operate with geo-location and spectrum sensing to avoid interference. In addition, some personal/mobile stations rely solely on spectrum sensing to avoid interference but do not use geo-location and database access.

FIG. 1 depicts the TVWS spectrum as presently provided in the United States. The shaded areas show the availability for unlicensed device operations. Channels 2-13 correspond to the TV channels 2-13, and these are Very High Frequency ("VHF") bands. Channels 14-51 represent a portion of the Ultra-High Frequency ("UHF") bands that were used as analog UHF channels. Each TV channel is 6 MHz wide, and thus the WS spectrum ranges from around 54 MHz to around 698 MHz. Certain channels are reserved, for example, 3, 4 and 37. As shown in the figure, certain channels below 20 are used only for fixed access station to other fixed station TV band devices ("TVBDs"). As shown in the figure, channels above 20 up to channel 51 are available for both fixed and personal or mobile stations that are TVBDs.

In order for the unlicensed users of the TVWS spectrum to operate without creating interference with existing transmissions such as digital TV broadcast stations, the FCC created mandatory guidelines for these new devices. All of the devices must perform spectrum sensing to sense licensed or other transmitters. Additional requirements depend on the device type. A "Mode I" device operates in client mode only, under the control of a master mode device. Because the master enables the Mode I device to transmit on certain channels, the Mode I device does not require geo-location service (such as Global Positioning System ("GPS"), for example) or access to the transmitter location data base. The Mode I device operates only on channels provided to it by a fixed access station, or by a Mode II TVBD. A "Mode II" personal/portable device is required to perform the location database queries, and, also to have geo-location. It may function as a master mode device and may perform network initiation. A "Special Mode" personal/portable device is authorized. These devices will not rely on database access or require geo-location. Instead these devices will rely on spectrum sensing to identify existing licensed transmitters such as TV broadcast transmitters, wireless mics, and other licensed transmitters. The FCC requires these devices to be tested and approved before use. These devices may act as a master mode device and may initiate a network.

Because the new requirements created by the FCC for implementing these devices requires that an unlicensed TVBD cease transmitting quickly (<2 s) when a licensed transmission is detected, methods and systems for implementing these devices in an efficient manner, including the capability to rapidly change channels within the TVWS to avoid interference, or to cease using the TVWS altogether, are needed. Therefore, what is needed in the art is a system and methods that provide optimal solutions for providing TV band devices that use the WS spectrum efficiently. Embodiments of the present invention address these needs.

SUMMARY OF THE INVENTION

These and other problems are generally solved or circumvented, and technical advantages are generally achieved, by embodiments of the present invention, which include a method, apparatus, and system for providing a communication resource for a communication device in a communication system. In one embodiment, an apparatus includes a processor and memory having computer program code. The memory and the computer program code is configured to, with the processor, cause the apparatus to perform at least the following: attach to an access station by sending a message over the air in an unlicensed frequency spectrum; receive an acknowledgement from the access station; and receive a multicast message from the access station indicating one selected from a channel change within the unlicensed frequency spectrum for a group including the apparatus and a radio technology change to a predetermined radio technology not using the unlicensed frequency spectrum. The access station may group the apparatus together with other apparatuses having a shared characteristic.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for grouping and managing communications of mobile stations using unlicensed spectrum, such as the TVWS spectrum that is now available for use by unlicensed devices in the United States, however the use of the methods and embodiments is not limited to any particular location, or spectrum, and should be read as generally applicable to communications systems. The invention, the use of the exemplary embodiments and the scope of the appended claims are not limited to any particular frequency spectrum or radio technology; and no limitations are to be inferred, implied or created due to the use of any explanatory examples or illustrations herein.

Figure 1:
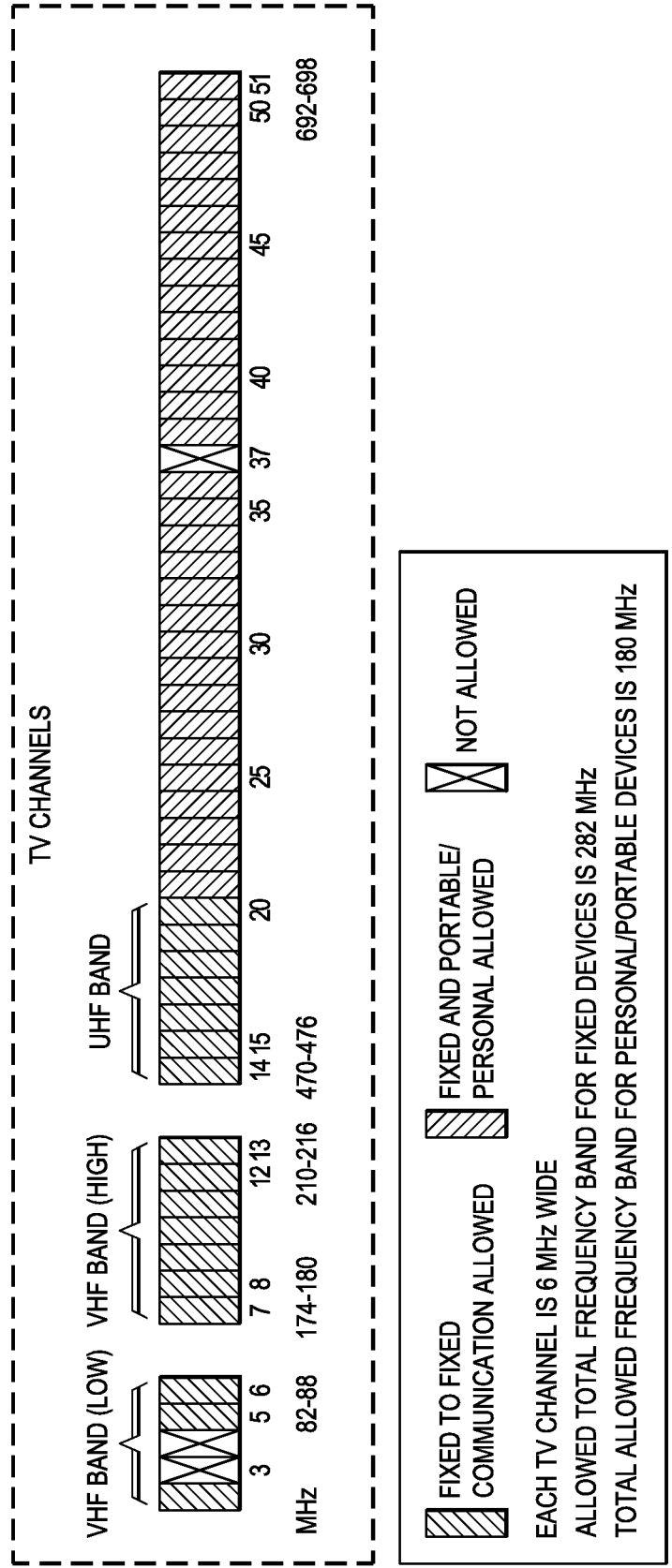
FIG. 1 illustrates the television white space spectrum available for unlicensed devices in the United States.
Figure 2:
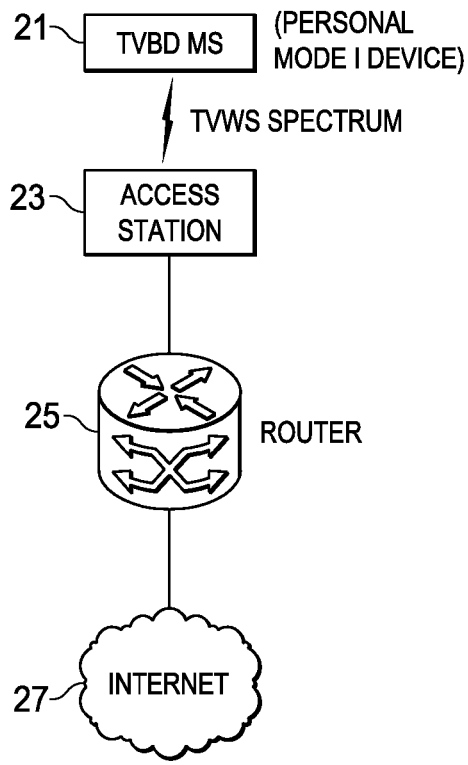
FIG. 2 illustrates a network reference model diagram of embodiments of communication systems including communication devices that provide an exemplary environment for application of embodiments of the invention.

Turning now to FIG. 2, illustrated is a very simple network reference model of an embodiment of a communication system including a fixed or access station 23 and personal communication devices (e.g., personal stations, mobile station or user equipment) "TVBD MS" 21 that provides an exemplary environment for application of embodiments of the invention. The access station 23 is coupled to a router 25 and further shown coupled to the internet 27. This is a typical connection, in addition, for compliance with the FCC regulations for unlicensed devices, certain devices need frequent internes access to update and query the TVWS location database containing the transmitter locations that must be checked by the TVBD devices. Communication links between the access station 23 and the internes 27 may be wireless or more likely wired, for example, it may use an Ethernet, fiber optics, copper, T1, DSL, or other wired connection. The access station 23 is also configured with a plurality of antennas to transmit and receive signals using the TVWS spectrum. Preferably the access station 23 may be a base station configured to support other radio access technologies ("RATs") such as WiMAX, GSM, 3GPP, 4G, CDMA, TDMA, LTE, LTE-A and the like in addition to the TVWS technology. In this document, the alternative radio access technologies may be referred to as "fallback" technologies.

Figure 3:
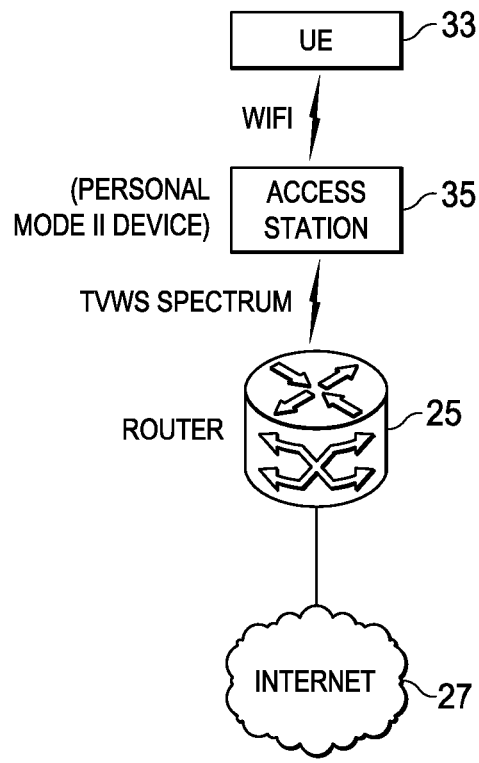
FIG. 3 illustrates another network reference model diagram of embodiments of communication systems including communication devices that provide an exemplary environment for application of embodiments of the invention.

FIG. 3 depicts another alternative network reference model diagram. In FIG. 3, the access station 35 is configured to operate a WiFi network to devices such as user equipment ("UE") 33. This may be, for example, a laptop or netbook computer or smartphone with WiFi capability. The access station 35 is also coupled via the TVWS spectrum to router 25 again onto the internet 27. Thus in this reference model the TVBD is the access station 35 and the router 25, not the personal mobile station. The router 25 and the access station 35 are wirelessly linked using the TVWS, using over the air radio communications. Typically, a packet based digital radio communication is used, and data packets transported over the air may include voice (and possible voice over internet protocol or "VoIP"), data, video, audio, internet browsing, text messages, SMS and other known data formats for communications and broadband services.

One important characteristic of the TVWS spectrum is that, compared to other wireless frequency spectrum for existing RATs, it is relatively low in frequency (the TVWS includes frequencies from 54-698 MHz) and thus has much greater physical range. The geographic area that an access or base station may serve (analogous to a wireless "cell") is therefore quite large. However, a consequence of this is that portable or mobile station devices may, as they move about, be in areas within the TVWS cell that would result in interference with different licensed transmitters. One mobile station ("MS") may be physically near a broadcast TV transmitter that is nowhere near another MS in the same TVWS cell, for example. If a very simple approach to the possible interference between any MS in a cell and a licensed transmitter is taken, then the entire TVWS cell associated with an access station or base station may be restricted to not using certain channels of the TVWS. This may be very inefficient as one MS may be very far away from the licensed transmitter and pose no risk of interference. In other words, edge areas of the TVWS cell may have interference issues that do not apply to devices located elsewhere in the same TVWS cell, and thus if all of the devices in the cell are treated the same way, devices in the entire cell may be unable to use the TVWS.

Events may occur that require changes in the use of the spectrum by unlicensed devices. A common event that is expected is the spectrum sensing by the TVBDs may detect a new wireless microphone coming into use. In that event, the TVBD that senses the transmitter on the spectrum reports the sensed transmitter; and the TVBDs that are using that channel must switch to an open channel elsewhere in the TVWS or, if that is not possible, cease transmitting on the TVWS. If the TVBD devices are multi-band devices, they may be able to switch to a fallback radio technology. If not, they must simply stop using the TVWS until another channel becomes available. It is expected that most TVBD devices will support a fallback technology, just as many cellphones presently in use can use more than one cellular standard radio access technology. So-called software defined radios are also contemplated where the devices may be provided with additional capability to use new radio technologies by changing software programmation for digital filtering, receivers, DSPs, etc. in the device, that allow the device capabilities to be upgraded by software changes only.

Figure 4:
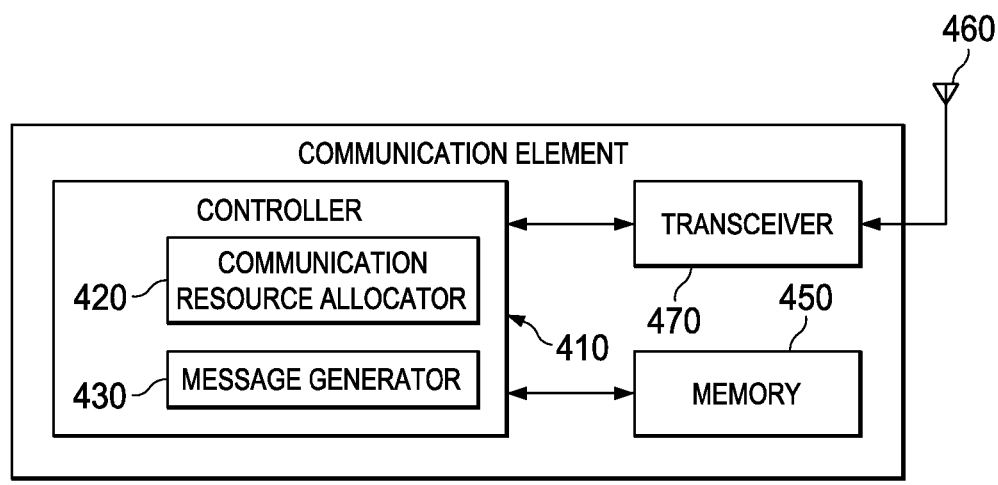
FIG. 4 illustrates a block diagram of an embodiment of a communication element of a wireless communication system that provides an environment for application of embodiments of the invention.

Referring now to FIG. 4, illustrated is a block diagram of an embodiment of a communication element of a communication system that provides an environment for application of embodiments of the invention. The wireless communication system may include, for example, a wireless cellular network implemented using TVBD devices. The communication element may represent, without limitation, a base station such as a TVBD access station, a subscriber station such as a wireless communication device or personal/portable station user equipment, a network control element, or the like.

The communication element includes a controller or processor 410, memory 450 that stores programs and data of a temporary or more permanent nature, an antenna 460, and a radio frequency transceiver 470 coupled to the antenna 460 and to the controller 410 for bidirectional wireless communications. The communication element may provide point-to-point and/or point-to-multipoint communication services.

The communication element may be coupled to a communication network element, such as a network control element of a public switched telecommunication network. A network control element generally provides access to a core communication network such as a public switched telecommunication network ("PSTN"). Access to the communication network may be provided in fixed facilities, such as a base station, using fiber optic, coaxial, twisted pair, microwave communication, or similar link coupled to an appropriate link-terminating element (not shown). A communication element formed as a wireless communication device such as user equipment is generally a self-contained communication device intended to be carried by an end user.

The controller 410 in the communication element, which may be implemented with one or a plurality of processing devices, performs functions associated with its operation including, without limitation, encoding and decoding of individual bits forming a communication message, formatting of information, and overall control of the communication element, including processes related to management of communication resources. Exemplary functions related to management of communication resources include, without limitation, hardware installation, traffic management, and performance data analysis, tracking of end users and equipment, configuration management, end user administration, management of subscriber stations, management of tariff, subscription, and security, and the like. The execution of all or portions of particular functions or processes related to management of communication resources may be performed in equipment separate from and/or coupled to the communication element, with the results of such functions or processes communicated for execution to the communication element. The controller 410 of the communication element may be of any type suitable to the local application environment, and may include one or more of general-purpose computers, special-purpose computers, microprocessors, digital signal processors ("DSPs"), field-programmable gate arrays ("FPGAS"), application-specific integrated circuits ("ASICS"), and processors based on a multi-core processor architecture, as non-limiting examples.

Typically in the environment of a base station using a packet switched digital data communication standard, the memory 450 and computer program code is configured to, with the controller (or processor) 410, assess a capacity of a communications channel such as a physical downlink communications channel ("PDCCH"), provide a pre-assigned communication resource for transmission of data to a communication device upon determining insufficient capacity is available in the PDCCH, and format the data for transmission to the communication device employing the pre-assigned communication resource. In a related embodiment, the controller (or processor) 410 includes a communication resource allocator 420 configured to assess a capacity (e.g., a bandwidth) of a PDCCH and provide a pre-assigned communication resource (via, for instance, radio resource control signaling) for transmission of data to a communication device (e.g., user equipment) upon determining insufficient capacity is available in the PDCCH. The pre-assigned communication resource may include a physical resource block and a modulation and coding scheme for transmission of the data, and be employed for an initial or retransmission of data. The communication resource allocator 420 is configured to provide a dynamically assigned communication resource for transmission of data to the communication device upon determining sufficient capacity is available in the PDCCH. The communication resources include information such as dynamic time and/or frequency allocation and the Modulation and Coding Scheme ("MCS") to be used in the transmission of data. The communication resource allocator 420 of the controller 410 may determine that insufficient capacity is available in the PDCCH as a function of channel quality information (e.g., wideband channel quality information) from the communication device or consecutive unreceived acknowledgments or non-acknowledgements from the communication device. A message generator 430 of the controller 410 is configured to format the data (e.g., a VoIP data packet) for transmission to the communication device employing the pre-assigned or dynamically assigned communication resource.

Typically in the environment of a communication device (e.g., user equipment), the memory 450 and computer program code is configured to, with the controller (or processor) 410, receive a pre-assigned communication resource, and decode data with the pre-assigned communication resource when insufficient capacity is available in the PDCCH. In a related embodiment, the controller (or processor) 410 is configured to receive a pre-assigned communication resource, and decode data with the pre-assigned communication resource when insufficient capacity (e.g., bandwidth) is available in the PDCCH. The controller 410 is also configured to decode the data with a dynamically assigned communication resource when sufficient capacity is available in the PDCCH. The controller 410 is configured to provide channel quality information (e.g., wideband channel quality information) to indicate an availability of the PDCCH. The pre-assigned communication resource may include a physical resource block, a modulation and coding scheme or periodicity pattern to decode the data provided via radio resource control signaling. The data may also be formatted as a VoIP data packet.

The transceiver 470 of the communication element modulates information onto a carrier waveform for transmission of the information or data by the communication element via the antenna 460 to another communication element. In an embodiment, the antenna 460 may include multiple antennas to support beam forming and/or multiple input multiple output ("MIMO") operations. As is known to those skilled in the art, MIMO operations may provide spatial diversity which can be used to overcome difficult channel conditions and/or increase channel throughput. The transceiver 470 demodulates information or data received via the antenna 460 for further processing by other communication elements.

The memory 450 of the communication element, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 450 may include program instructions or computer program code that, when executed by an associated processor, enable the communication element to perform tasks as described herein. Exemplary embodiments of the system, subsystems and modules as described herein may be implemented, at least in part, by computer software executable by processors of, for instance, the user equipment and the base station, or by hardware, or by combinations thereof. As will become more apparent, systems, subsystems and modules may be embodied in the communication element as illustrated and described above.

The FCC regulations providing the rules for unlicensed devices in the TVWS allow several modes of operation for personal/portable devices. A "Mode I" device operates in client mode only, under the control of a master mode device. Because the master enables the Mode I device to transmit, the Mode I device does not require geo-location service (such as GPS, for example) or access to the location data base. The Mode I device operates only on channels provided to it by a fixed access station, or by a Mode II TVBD. A "Mode II" personal/portable device is required to perform data base queries, and, to have geo-location. It may function as a master mode device and may perform network initiation. A "Special Mode" personal/portable device is authorized. These devices will not rely on database access or require geo-location. Instead these devices will rely on spectrum sensing to identify existing licensed transmitters such as TV broadcast transmitters, wireless mics, and other licensed transmitters. The FCC requires these devices to be tested and approved before use. These devices may act as a master mode device and may initiate a network.

Figure 5:
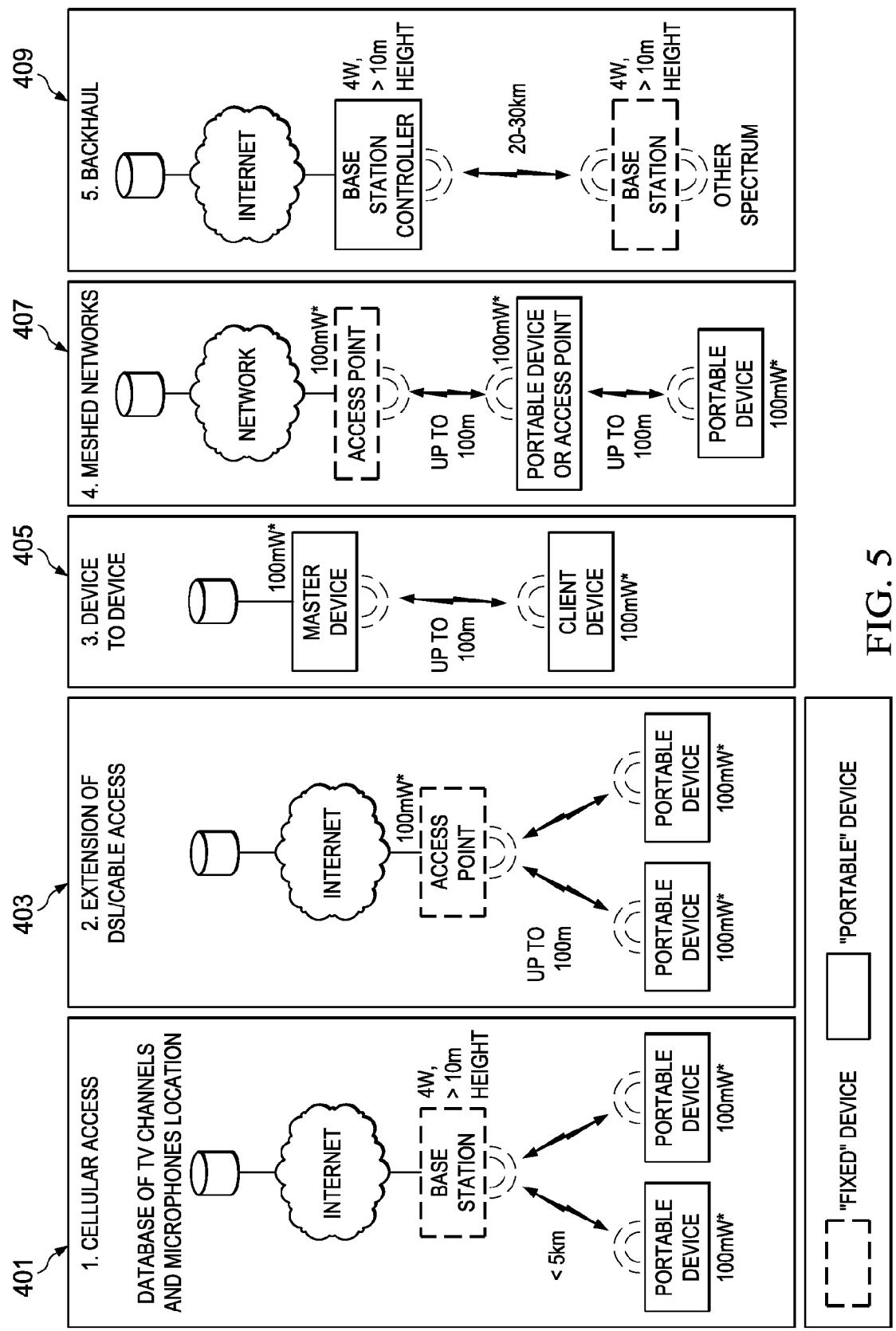
FIG. 5 illustrates several usage cases of embodiments of communications systems that each provide an exemplary environment for application of embodiments of the invention.

Although in a simple example the personal/portable TVBDs may be described as cellphones, smartphones, or PDAs, these are illustrative examples and are not limiting. Several usage models are now presented to illustrate general TVWS applications. FIG. 5 depicts 5 different example usage models, these are presented only to illustrate possible usages, and the use of the unlicensed spectrum may actually include other usages. In the example 401 labeled "1. Cellular access" a cellphone usage model is shown. A TVBD base station "BS" is coupled to the internet, and, to the database of licensed transmitters. The base station has up to a 4 W power rating and antennas with less than 10 meters height. Two portable devices are shown with up to 100 milliwatts transmit power and are located less than 5 kilometers from the base station.

In FIG. 5, the second usage example is numbered 403 and labeled "2. Extension of DSL/cable access." In this model a TVBD access point "AP" is coupled to the internet and to the database of licensed transmitters. The AP has up to 100 milliwatts power. There are again two portable devices shown with up to 100 milliwatts power. The portable devices are up to 100 meters from the AP. This usage model contemplates providing wireless internet access to devices in a small area, such as an office or home, restaurant, hotel, etc.

In FIG. 5, the third usage example 405 illustrated is labeled "3. Device to Device". Here a master device is shown connected to the required location database of licensed transmitters. The Master device has a power rating of up to 100 milliwatts. A client device, not accessing the database, is shown coupled to the master using the TVWS spectrum and up to 100 meters away. The client also has a transmit power of up to 100 milliwatts.

In FIG. 5, the fourth usage example 407 is labeled "4. Meshed networks." In this example, an access point ("AP") with a transmit power of up to 100 milliwatts is shown coupled to the network and to the database of licensed transmitters. A device, illustrated as either a "portable device or AP" represents a device that may be a portable device or a second fixed access point AP, shown coupled wirelessly over the TVWS spectrum to the first AP. A second portable device is then shown up to 100 meters away and coupled wirelessly over the TVWS spectrum to the first portable device.

The final usage example shown in FIG. 5 is for a "backhaul" link between two fixed devices, in example 409, labeled "5. Backhaul." This example shows two base stations, one a "BSC" or base station controller coupled to the Internet and to the database of licensed transmitters, and the other coupled to the BSC and transmitting in another spectrum, providing a backhaul capability for messages between base stations or messages relayed from a personal station using another spectrum to the network. Due to the transmit power for these devices, of up to 4 Watts, and the antennas, the range is extended to 20-30 kilometers. These and other usages may be implemented using the unlicensed devices and the TVWS spectrum, so long as the devices comply with the requirements not to interfere with licensed devices in the spectrum.

Currently an IEEE standard referred to as "802.22" is being developed to address how to implement unlicensed devices operating in the TVWS. As presently proposed, the devices within a cell served by an access point ("AP") are to be treated together as a single group. The consequence of this approach is that if any of the personal/mobile stations or a fixed station using spectrum sensing encounters a licensed broadcast station or senses a new wireless mic such that interference may occur, all of the devices served by the access point will be required to change channels or cease transmitting in the TVWS. Because at the relatively low frequencies in the TVWS spectrum, the physical range of the base station is very large, it is an inefficient use of spectrum to use this coarse approach. By grouping all of the devices together in this manner, all of the devices have to change frequency, or quit using the TVWS if any of the devices is near an interference situation.

Embodiments of the present invention provide different, and more efficient, approaches to implementing the needed change of channel or change in transmission for TVBD devices that will result in a more optimal use of the unlicensed spectrum than the known approaches. A variety of criteria are used to form groups within a cell, and these groups may be switched to a new channel or to an alternative radio access technology in a variety of efficient message schemes.

Embodiments include methods of grouping the TVBD personal stations on several different characteristics. For example, grouping may be done by an access station device based on the current TVWS channel the devices are using. In an alternative embodiment, TVBD MS devices that are capable of switching to certain common channels in the TVWS may be grouped together, so that the switch to these channels may be quickly performed. In another embodiment TVBDs that are capable of switching to a particular "fallback" technology such as CDMA or HSPA may be grouped together. Other characteristics may be used. A personal station/mobile device may be placed in several different groups and any group may be moved to an alternative TVWS channel, or a fallback technology, with a single group transmission or multicast message from the access point or base station. Because devices within a cell can be grouped in a variety of ways, when a TVBD senses a transmitter that may cause interference, less than all of the TVBD devices in a cell may respond by changing channels or ceasing TVWS transmission. In this manner the TVWS may be used efficiently. The TVBD MS personal devices need not be aware of the grouping in all embodiments, or alternatively the TVBD MS may be assigned a group ID that it is aware of. For example if the multicast messages are to be sent using an internet protocol ("IP") protocol message, then the group ID will be known to the mobile stations. However if the access station is managing the grouping with Media Access ("MAC") layer radio multicast messages, the MS is not necessarily aware of the grouping, in these embodiments the access station will send the appropriate multicast messages to the grouped mobile stations.

Additional embodiments of the invention can provide further optimization of the use of the spectrum. The access station or master mode devices may arrange for a rapid context exchange (moving a group to another channel, or to a fallback technology) in advance of a triggering event. Then, for example, if a new licensed transmitter is detected by spectrum sensing or by a query of the location database, and a change is required to a new channel or technology, the entire group may move with a single message, saving system message overhead. The registration and attachment processes that would otherwise be required for each device to use an alternative channel or radio technology may be simplified, as the new base station will already have the information needed to authorize the MS devices. In this manner, when a handover is initiated to a fallback technology for example, the target base station can utilize the group ID to verify that the group of devices has already been authenticated. This feature of the embodiments substantially reduces signaling overhead that would otherwise be required.

In order to communicate a context change, multicast messages may be used. These may be MAC layer messages ("layer 2") or multicast IP messages ("layer 3"). In the case of a layer 3 message, the TVBDs attach to groups that are formed based on any of the above described criteria, or other criteria. The TVBDs will be associated with one or more groups for multicast depending on their capabilities and the criteria that was used for grouping.

If the implementation uses IP multicast technology, the base station or access point will implement multicast groups. In this approach, the group ID or multiple group IDs are known to the TVBD MS devices. The TVBD MS devices will join these groups based on various criteria. IP multicast messages may then be defined which will be provided to the TVBD MS devices grouped together to cause them to switch to another channel in the TVWS, or, to a fallback technology.

In another approach, the access stations may group the MS devices, and send multicast messages to the appropriate group of devices without the MS devices being aware of the grouping. The MS devices will attach to the access station, which then manages the grouping of devices and the access station is aware of which groups the mobile devices are in, but the mobile devices need not store any information or be aware of the grouping, they will receive and respond to a multicast message directed to them by the access station they are attached to.

As a further optimization using the present invention, the fallback technology network may pre-allocate resources to the group in advance of the event, so that if the TVWS becomes unavailable, the group may move to the fallback technology without the need to perform lengthy registration and authorization processes. Parameters needed by the TVBD MS devices in the group to use the fallback technology may be passed to them in advance as well, using the group ID and TVWS messages, ahead of the switch. As a result, following a switch to the fallback technology, the devices will not have to perform the lengthy registration and authorization procedures and substantial signaling overhead can be saved, thereby optimizing spectrum usage.

Figure 6:
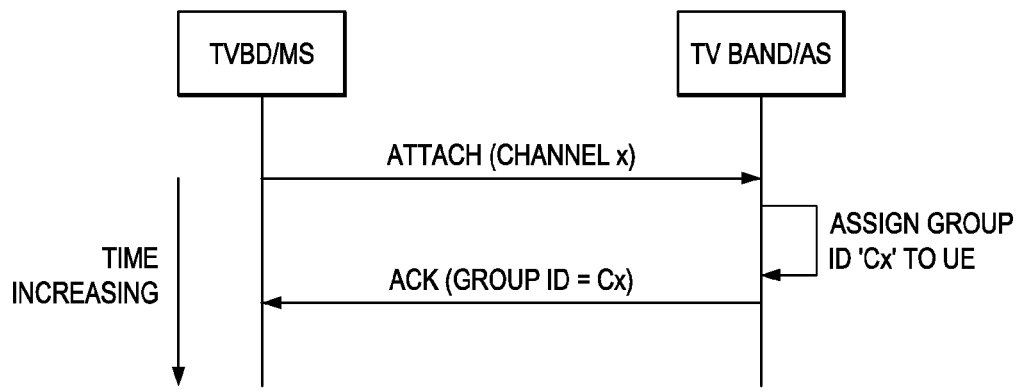
FIG. 6 illustrates a signaling diagram of a method of operating a communication system in accordance with embodiments of the invention.

FIG. 6 depicts in a signaling diagram an attachment and acknowledgement sequence of an exemplary TVWS communication embodiment. In FIG. 6, a mobile station TVBD MS powers on or otherwise begins operation in a cell served by a TVBD access station TV Band/AS. In FIGS. 6-10, time increases as shown by the arrow going down the page, the first message in time is closest to the top of the page. In this example, the MS first transmits an "Attach" message. The TV Band access station receives the message and in this exemplary embodiment, it then assigns a group ID to the MS, based on some characteristic or common feature. The Group ID "Cx" is transmitted to the MS with an acknowledge message labeled "Ack." In this embodiment the mobile station is aware of the group ID. For future messages transmitted on the TVWS spectrum, the MS will know it is to respond to messages including that group ID "Cx". However, in some embodiments the access station or ("AS") will keep track of the grouping information and the mobile station ("MS") does not have and is not aware of its own group ID. In those methods the access station sends a multicast message to the appropriate MS devices as needed to change parameters.

Figure 7:
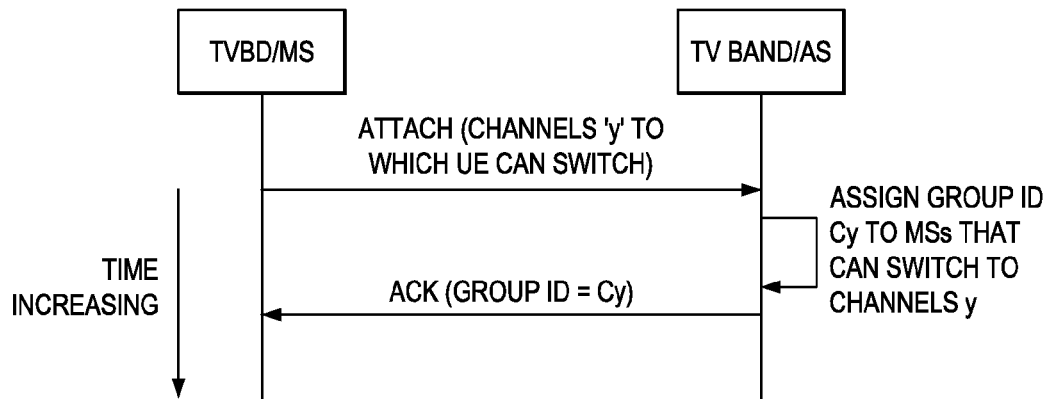
FIG. 7 illustrates a signaling diagram of a method of operating a communication system in accordance with embodiments of the invention.

FIG. 7 depicts in an alternative method embodiment another method to assign a group ID. In FIG. 7, the MS transmits, on power up or when moving into the cell served by the access station ("AS"), a list of channels "y" that the MS can switch to. The AS then examines the list and determines which group or groups this MS can belong to. An "Acknowledge" is transmitted to the MS including one or more Group IDs the MS now belongs to. When a future message is transmitted including that group ID, the MS will acknowledge it and either switches to a different channel in the TVWS as indicated by the group ID parameters, or, switch to a fallback technology and cease transmissions on the TVWS.

Figure 8:
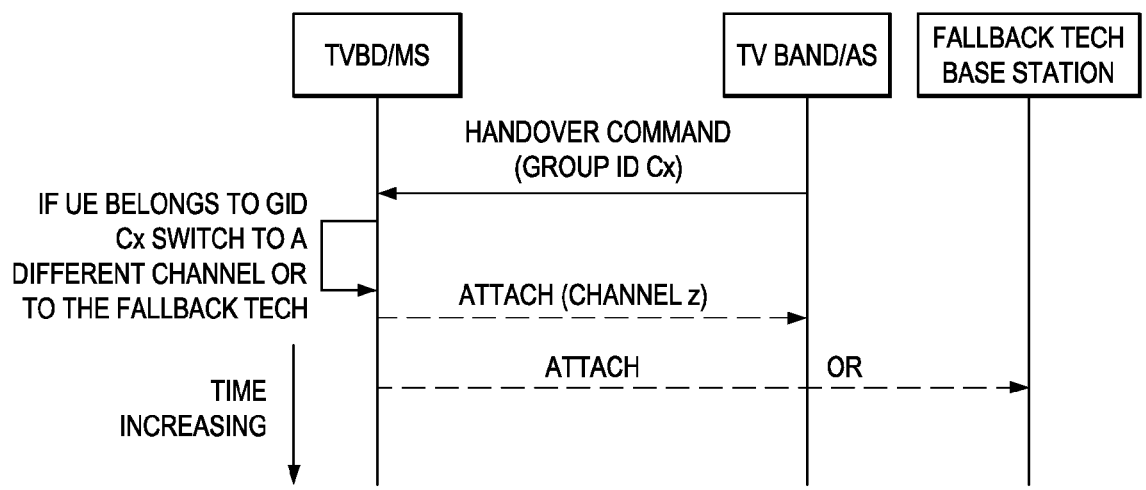
FIG. 8 illustrates a signaling diagram of a method of operating a communication system in accordance with embodiments of the invention.

In FIG. 8 a handover command using the group ID is shown in a signaling diagram. The TV Band AS transmits a command to all TVBD MS devices in the group Cx. The MS then has to receive and examine the multicast message to see if it is a member of the effected group, if so, the response of the MS is shown by transmitting either an "Attach" on a new channel in the TVWS, or an "Attach" on a fallback technology.

Figure 9:
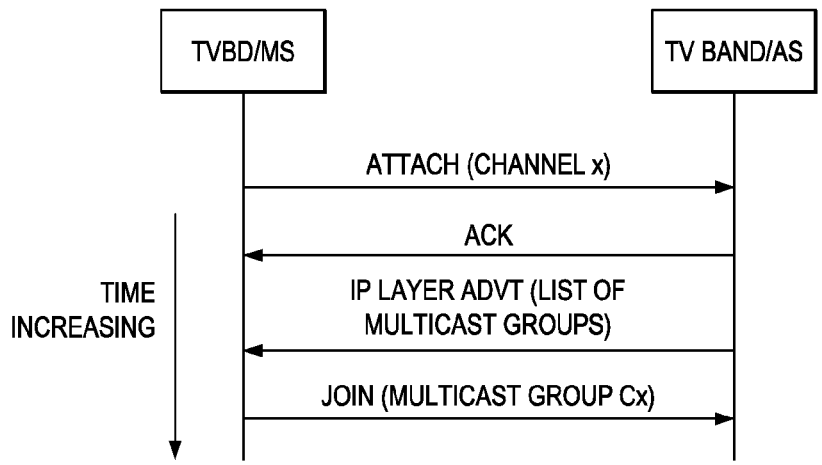
FIG. 9 illustrates a signaling diagram of a method of operating a communication system in accordance with embodiments of the invention.

FIG. 9 illustrates another exemplary embodiment for the TVBD channel optimization. In FIG. 9, an MS first attaches to the TV Band AS and receives an acknowledgement. The TV Band AS then transmits an IP Layer message including a list of possible multicast groups for the MS to join. The MS then responds with one or more groups that it will join with a message labeled 'Join Multicast Group Cx". An MS may join one group, or many groups based, on different characteristics.

Figure 10:
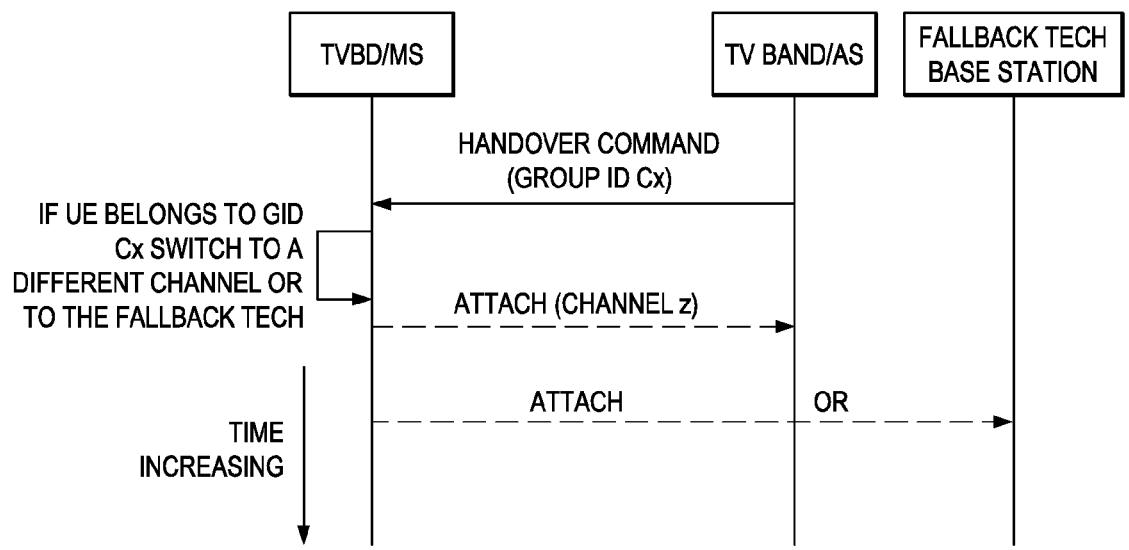
FIG. 10 illustrates a signaling diagram of a method of operating a communication system in accordance with embodiments of the invention.

FIG. 10 then illustrates the use of the multicast groups in a handover situation. In FIG. 10, an IP multicast message is transmitted from the TV BAND/AS to the group with ID "Group ID Cx"; if the MS belongs to the group with ID "Cx", it will recognize the message is for that group. In response, the MS will switch to a different channel (in one alternative embodiment) or, switch to another fallback technology (in yet another alternative embodiment). The switch channel can be updated or the fallback technology may be selected by configuration messages sent prior to the spectrum sensing or other trigger event. Note that spectrum sensing is only one possible event, for example the geographic database may be updated indicating a new licensed transmitter is starting in an area where interference would be caused. Other network purposes may be served by moving groups to optimize system or spectrum resources and the TV Band AS may receive an indication that a change is needed. The reasons to perform a group handover or to transition to a different channel or to an alternative RAT is not limited to those described here.

In addition to other embodiments, a variety of frequency spectrums may be used with embodiments of the invention. In one exemplary example, the TVWS as currently defined in the United States is used, in this example; the unlicensed frequency spectrum is a spectrum less than 1 GHz. The methods described herein are not, however, limited to any particular frequency spectrum; and may be applied to any other frequency spectrum to form additional alternative embodiments. In some embodiments, the unlicensed frequency spectrum is a spectrum that includes television broadcast stations. However, this is only exemplary and is not required to use the exemplary embodiments. Other transmitters such as wireless microphones, medical telemetry, radio telescopes, and the like may, or may not, be present in a particular case. Again the embodiments are not limited to applications In addition, embodiments may include methods where a variety of characteristics of mobile station are used as part of the grouping operations. In one exemplary embodiment, the characteristics include: the current frequency being used in the unlicensed frequency spectrum; alternative channels that may be used within the unlicensed frequency spectrum; and alternative radio access technologies that may be used. Additional embodiments may be formed using other characteristics as well and the claims are not limited to this example.

In other method embodiments, a method is provided for operating an access station device, comprising receiving over an unlicensed frequency spectrum, a message from a mobile station receiver indicating it is available for communications; assigning a group ID to the mobile station; transmitting the group ID to the mobile station over the unlicensed frequency spectrum; and receiving a message over the unlicensed frequency spectrum indicating the mobile station has detected a licensed transmitter where interference will occur. Further embodiments include the above described method wherein assigning the group ID further comprises receiving characteristics from the mobile station and determining an appropriate group from a plurality of groups, and assigning the group ID to the mobile station. In another embodiment, the characteristics include one selected from the channel being currently used in the unlicensed frequency spectrum, alternative channels the mobile station may use, and alternative radio access technologies the mobile station may use. In a further alternative embodiment, the method further comprises identifying a group of mobile stations using the unlicensed frequency spectrum where a context switch is required to prevent interference with another transmitter; sending a multicast message comprising at least the group ID for the group and indicating a context switch; and communicating with at least one mobile station following the context switch. In still another embodiment, the method is performed wherein the unlicensed frequency spectrum is a spectrum less than 1 GHz. However, the method is not limited to any particular frequency spectrum. In still another embodiment, the method is performed wherein the unlicensed frequency spectrum includes spectrum used by television stations for broadcast. Again this is one example and the presence of any other transmitters in the spectrum is not required.

In addition to the embodiments described so far, program or code segments making up the various embodiments of the present invention may be stored in a computer readable medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk-ROM ("CD-ROM"), an optical disk, a hard disk, a fiber optic medium, a radio frequency ("RF") link, and the like. The code segments may be downloaded via computer networks such as the Internet, Intranet, and the like.

As described above, the exemplary embodiments provide both methods and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
at least one processor; and
at least one memory including computer program code;
the at least one memory and the computer program code configured to, with the at least one processor, cause the apparatus at least to:
transmit an attach message over the air to an access station on a whitespace spectrum, wherein the white space spectrum comprises frequencies allocated to a television broadcasting service;
provide at least one characteristic to the access station within the attach message that is utilized as a criteria for grouping unlicensed devices for transmission over the white space spectrum;
wherein the at least one characteristic is defined based on the following:
certain common channels within the white space spectrum which can be switched to by the unlicensed devices; and
a particular fallback radio technology not using the white space spectrum which the unlicensed devices can switch to from the white space spectrum;
receive an acknowledgement for the attach message from the access station over the air using the white space spectrum; and
receive a multicast message following the received acknowledgement indicating either a channel change within the whitespace spectrum for a group of unlicensed devices including the apparatus, or a radio technology change to a predetermined fallback radio technology not using the white space spectrum.

2. The apparatus according to claim 1 wherein the at least one memory including the computer program code is configured to, with the at least one processor, cause the apparatus to at least sense another transmitter using the white space spectrum and to determine that an interference is likely, and to form a message indicating a location of the transmitter and to transmit the message over the air.

3. The apparatus according to claim 1 wherein the at least one memory including the computer program code is configured to, with the at least one processor, cause the apparatus to provide a radio resource using an alternative radio technology.

4. The apparatus according to claim 1 wherein the at least one memory including the computer program code is configured to, with the at least one processor, cause the apparatus to provide an internet protocol ("IP") connection using a radio resource.

5. The apparatus according to claim 1 wherein the at least one memory including the computer program code is configured to, with the at least one processor, cause the apparatus to provide a radio resource over several channels using the white space spectrum.

6. The apparatus according to claim 1 wherein the at least one memory including the computer program code is configured to, with the at least one processor, cause the apparatus to at least perform:
receiving a multicast message indicating a change to another channel within the white space spectrum is required;
changing parameters to form a radio resource for over the air messages on the white space spectrum at the new channel; and
acknowledging the message.

7. The apparatus according to claim 1 wherein the at least one memory including the computer program code is configured to, with the at least one processor, cause the apparatus to at least perform:
receiving a message indicating an available group ID over the white space spectrum;
providing an acknowledgement confirming the group ID over the white space spectrum;
receiving a multicast message containing the group ID indicating a change to a fallback radio technology not using the white space spectrum is required; and
changing parameters to form a radio resource for over the air messages on the fallback radio technology.

8. A computer program product comprising a program code stored in a non-transitory computer readable medium configured to cause an apparatus to at least perform:
transmitting an attach message over the air to an access station on a whitespace spectrum, wherein the white space spectrum comprises frequencies allocated to a television broadcasting service;
providing at least one characteristic to the access station within the attach message that is utilized as a criteria for grouping unlicensed devices for transmission over the white space spectrum;
wherein the at least one characteristic is defined based on the following:
certain common channels within the white space spectrum which can be switched to by the unlicensed devices; and
a particular fallback radio technology not using the white space spectrum which the unlicensed devices can switch to from the white space spectrum;
receiving an acknowledgement for the attach message from the access station over the air using the white space spectrum; and
receiving a multicast message following the received acknowledgement indicating either a channel change within the whitespace spectrum for a group of unlicensed devices including the apparatus, or a radio technology change to a predetermined fallback radio technology not using the white space spectrum.

9. The computer program product according to claim 8 wherein the program code stored in the computer readable medium is configured to cause the apparatus to at least perform:
sensing another transmitter using the white space spectrum and to determine that interference is likely, and forming a message indicating a location of the transmitter and transmitting the message over the air using the white space spectrum.

10. An apparatus, comprising:
at least one processor; and
at least one memory including computer program code;
the at least one memory and the computer program code configured to, with the at least one processor, cause the apparatus at least to perform:
receiving an attach message indicating a mobile station is available for messages over the air on a white space spectrum, wherein the white space spectrum comprises frequencies allocated to a television broadcasting service;
receiving at least one characteristic within the attach message that is utilized as a criteria for grouping unlicensed devices for transmission over the white space spectrum; wherein the at least one characteristic is defined based on the following:
certain common channels within the white space spectrum which can be switched to by the unlicensed devices; and
a particular fallback radio technology not using the white space spectrum which the unlicensed devices can switch to from the white space spectrum;
providing an acknowledgement for the attach message assigning a group ID to the mobile station;
and transmitting a message containing the group ID indicating either a channel change within the whitespace spectrum for a group of unlicensed devices corresponding to the group ID, or a radio technology change to a predetermined fallback radio technology not using the white space spectrum.

11. The apparatus according to claim 10 wherein the at least one memory including the computer program code is configured to, with the at least one processor, cause the apparatus to at least provide an alternative radio technology communication resource.

12. The apparatus according to claim 10 wherein the at least one memory including the computer program code is configured to, with the at least one processor, cause the apparatus to at least provide an internet protocol ("IP") radio technology communication resource.

13. The apparatus according to claim 10 wherein the at least one memory including the computer program code is configured to, with the at least one processor, cause the apparatus to at least provide a radio resource over several channels using the white space spectrum.

14. The apparatus according to claim 10 wherein the at least one memory including the computer program code is configured to, with the at least one processor, cause the apparatus to at least perform:
receiving a message over the air using the white space spectrum indicating a licensed transmitter has been sensed using the white space spectrum;
using the group ID, transmitting a multicast message indicating a context change for the group corresponding to the group ID selected from a switch to another channel within the white space spectrum, and a switch to a predetermined alternative radio resource technology.

15. A method comprising:
attaching to an access station in an over the air communications system using a white space spectrum, wherein the white space spectrum comprises frequencies allocated to a television broadcasting service;
receiving from the access station over the white space spectrum an acknowledgement;
sensing another transmitter using the white space spectrum in a manner that will cause interference;
sending a message over the white space spectrum indicating interference will occur;
receiving from the access station in response to the message a list of available groups that may be joined and characteristics corresponding to the groups, wherein the characteristics are utilized as a criteria for grouping unlicensed devices for transmission over the white space spectrum;
wherein the characteristics are defined based on the following:
certain common channels within the white space spectrum which can be switched to by the unlicensed devices; and
a particular fallback radio technology not using the white space spectrum which the unlicensed devices can switch to from the white space spectrum;

selecting from the list of groups one or more group IDs based on the characteristics; and transmitting an acknowledge message over the white space spectrum indicating at least one group ID that will be joined.

16. The method of claim 15 further comprising receiving a context switch message as a multicast message.

17. The method of claim 16 and further comprising switching to another channel within the white space spectrum in response to the multicast message.

18. The method of claim 16 and further comprising switching to another radio access technology in response to the multicast message.

* * * * *